US008923714B2

(12) United States Patent
Iinuma

(10) Patent No.: US 8,923,714 B2
(45) Date of Patent: Dec. 30, 2014

(54) IMAGE FORMING APPARATUS AND IMAGE FORMING METHOD WITH REDUCED COLOR MATERIAL USAGE

(71) Applicant: Canon Kabushiki Kaisha, Tokyo (JP)

(72) Inventor: Osamu Iinuma, Machida (JP)

(73) Assignee: Canon Kabushiki Kaisha, Tokyo (JP)

( * ) Notice: Subject to any disclaimer, the term of this patent is extended or adjusted under 35 U.S.C. 154(b) by 35 days.

(21) Appl. No.: 13/660,390

(22) Filed: Oct. 25, 2012

(65) Prior Publication Data
US 2013/0108296 A1 May 2, 2013

(30) Foreign Application Priority Data

Nov. 2, 2011 (JP) ................................. 2011-241526
Oct. 16, 2012 (JP) ................................. 2012-229246

(51) Int. Cl.
G03G 15/00 (2006.01)
G06F 3/12 (2006.01)

(52) U.S. Cl.
CPC ............ G06F 3/1219 (2013.01); G06F 3/1285 (2013.01); G03G 15/556 (2013.01); G06F 3/1229 (2013.01); G06F 3/1254 (2013.01); G03G 15/5062 (2013.01)
USPC .......................................................... 399/53

(58) Field of Classification Search
CPC .............. G03G 15/09; G03G 15/0121; G03G 15/0806; B41J 3/1219; B41J 3/1239; H04N 1/00954
USPC .............. 399/43, 44, 53, 55, 66, 254, 270, 27
See application file for complete search history.

(56) References Cited

U.S. PATENT DOCUMENTS

2003/0043392 A1* 3/2003 Sugimoto
2004/0190057 A1* 9/2004 Takahashi et al. ........... 358/1.15
2007/0147854 A1* 6/2007 Yamada .......................... 399/12
2011/0020022 A1* 1/2011 Obara et al. .................... 399/53
2011/0182604 A1* 7/2011 Otsuka et al. ................... 399/53

FOREIGN PATENT DOCUMENTS

JP 2001-83845 A 3/2001
JP 2006-235237 A 9/2006

OTHER PUBLICATIONS

Machine Translation JP 2006-235237 A Jul. 9, 2006 Eiji et al.*
Machine Translation JP 2001-083845 Fukuazawa Sanae.*

* cited by examiner

Primary Examiner — G. M. Hyder
Assistant Examiner — Travis Harper
(74) Attorney, Agent, or Firm — Fitzpatrick, Cella, Harper & Scinto

(57) ABSTRACT

This invention provides an apparatus and method capable of strictly keeping to a preset toner consumption amount and maintaining an image quality the user wants. A target toner save value used in toner save processing is set. In accordance with the set target toner save value, toner save processing is performed for data of the first page of image data formed from a plurality of pages. A toner save amount before and after toner save processing is calculated, and the difference value between the calculated toner save amount and the set target toner save value is calculated. Target toner save values for data of Nth and subsequent pages (N is an integer of 2 or more) of the image data formed from a plurality of pages are decided based on the calculated difference value of the target toner save value.

7 Claims, 13 Drawing Sheets

FIG. 6

TONER CONSUMPTION AMOUNT IN TONER SAVING

SELECT CONSUMPTION AMOUNT

601 — NONE   75%   50%   25%

602 — OK   CANCEL — 603

FIG. 7

PRIORITY ITEM IN TONER SAVING

SELECT ITEM IMAGE QUALITY OF WHICH HAS PRIORITY IN TONER SAVING

● PHOTO PRIORITY
○ TEXT PRIORITY — 701

702 — OK   CANCEL — 703

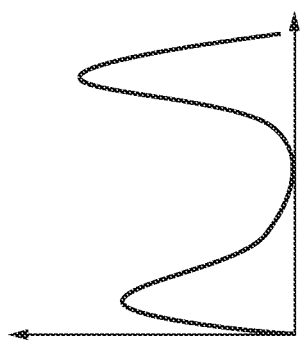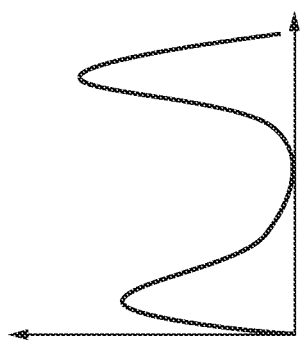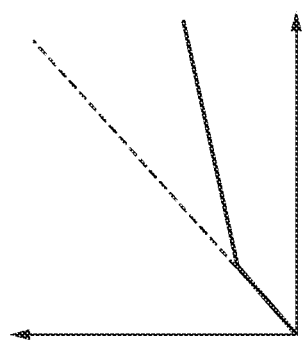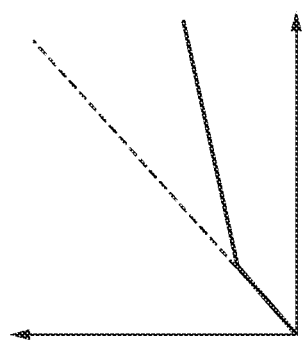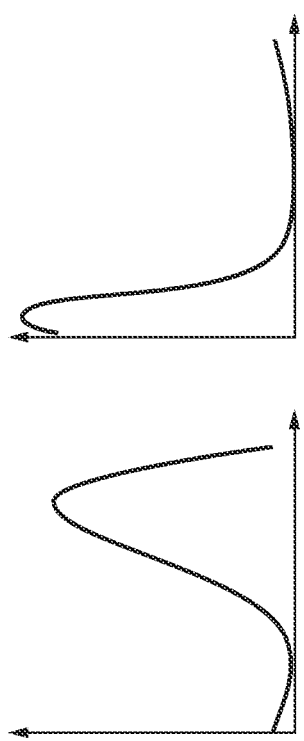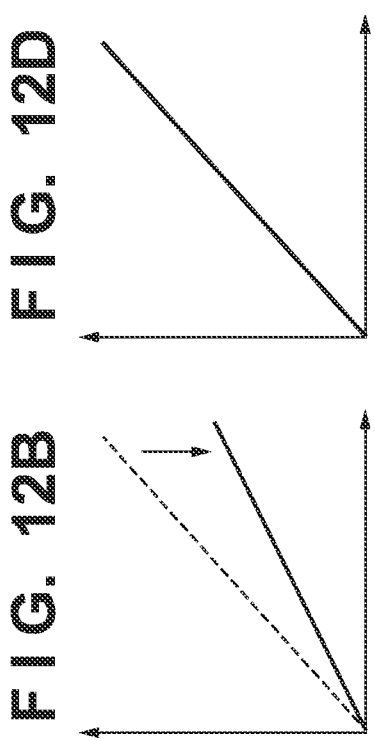

IMAGE FORMING APPARATUS AND IMAGE FORMING METHOD WITH REDUCED COLOR MATERIAL USAGE

BACKGROUND OF THE INVENTION

1. Field of the Invention

The present invention relates to a technique of forming an image at a predetermined toner consumption amount.

2. Description of the Related Art

A processing mode, called "toner save mode", for suppressing the color material consumption amount of an image forming apparatus is widely known as a function of reducing the density in printing to save printing costs. Recently, in the toner save mode, the same image quality as that output in normal printing is requested of processing while saving toner.

As this processing method, there is proposed a method of switching an optimum toner save method (method of thinning out pixels in a predetermined cycle or a method using a toner save gamma correction table) for each object which forms a document to be printed (see, for example, Japanese Patent Laid-Open No. 2001-083845).

However, in the prior art literature, the toner save method is switched for each object. Depending on the ratio of each object to a document, the toner consumption amount in toner saving changes.

SUMMARY OF THE INVENTION

The present invention provides an apparatus and method capable of keeping to a preset toner consumption amount during toner saving, while still maintaining the user's desired image quality.

The present invention comprises the following arrangement.

According to one aspect of the present invention, an image forming apparatus comprises: a setting unit configured to set a target toner save value used in toner save processing; a processing unit configured to perform, in accordance with the target toner save value set by the setting unit, toner save processing for data of a page of interest of a print job formed from a plurality of pages; and a calculation unit configured to calculate, as a toner save amount, a toner consumption amount difference before and after the toner save processing by the processing unit, and calculating a difference value between the calculated toner save amount and the target toner save value set by the setting unit, wherein the setting unit sets a target toner save value for data of a page next to the page of interest and subsequent pages, based on the difference value calculated by the calculation unit.

According to the present invention, a preset toner consumption amount in toner saving can be strictly adhered to, and the user's desired image quality can be maintained.

Further features of the present invention will become apparent from the following description of exemplary embodiments with reference to the attached drawings.

BRIEF DESCRIPTION OF THE DRAWINGS

FIG. 6 is a view showing a screen which prompts the user to select a toner consumption amount in toner saving;

FIG. 7 is a view showing a screen which prompts the user to select a priority item in toner saving;

FIGS. 12A to 12F are graphs each showing the distribution characteristic of the histogram of a photo part;

DESCRIPTION OF THE EMBODIMENTS

Preferred embodiments of the present invention will now be described in detail, with reference to the accompanying drawings.

First Embodiment

The first embodiment will describe a method capable of keeping the setting of a toner save amount and ensuring a user's desired image quality in an image forming apparatus. As the image forming apparatus, the embodiment will exemplify a multi-function peripheral having a plurality of functions (for example, copy, print, and FAX).

<Description of Outline of Overall Arrangement>

Figure 1:
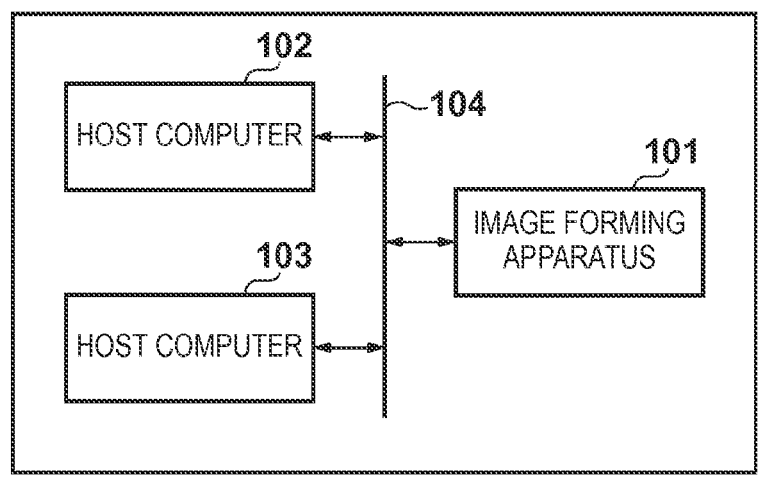
FIG. 1 is a block diagram exemplifying the arrangement of a printing system.

An example of the arrangement of a printing system including an image forming apparatus which implements toner save printing, and a plurality of host computers will be explained with reference to a block diagram shown in FIG. 1. An image forming apparatus 101 shown in FIG. 1 can implement printout from host computers 102 and 103 via a network 104. By using an image reading apparatus (not shown) accessory to itself, the image forming apparatus 101 can transmit read image data to the host computers 102 and 103. Further, by using a printing apparatus (not shown) accessory to itself, the image forming apparatus 101 can print out (copy) read image data.

The first embodiment assumes printout from the host computers 102 and 103. However, the present invention is not limited to this and is effective even in a copy operation which similarly uses a printing apparatus.

<Toner Save Printing Instruction Method>

Figure 2:
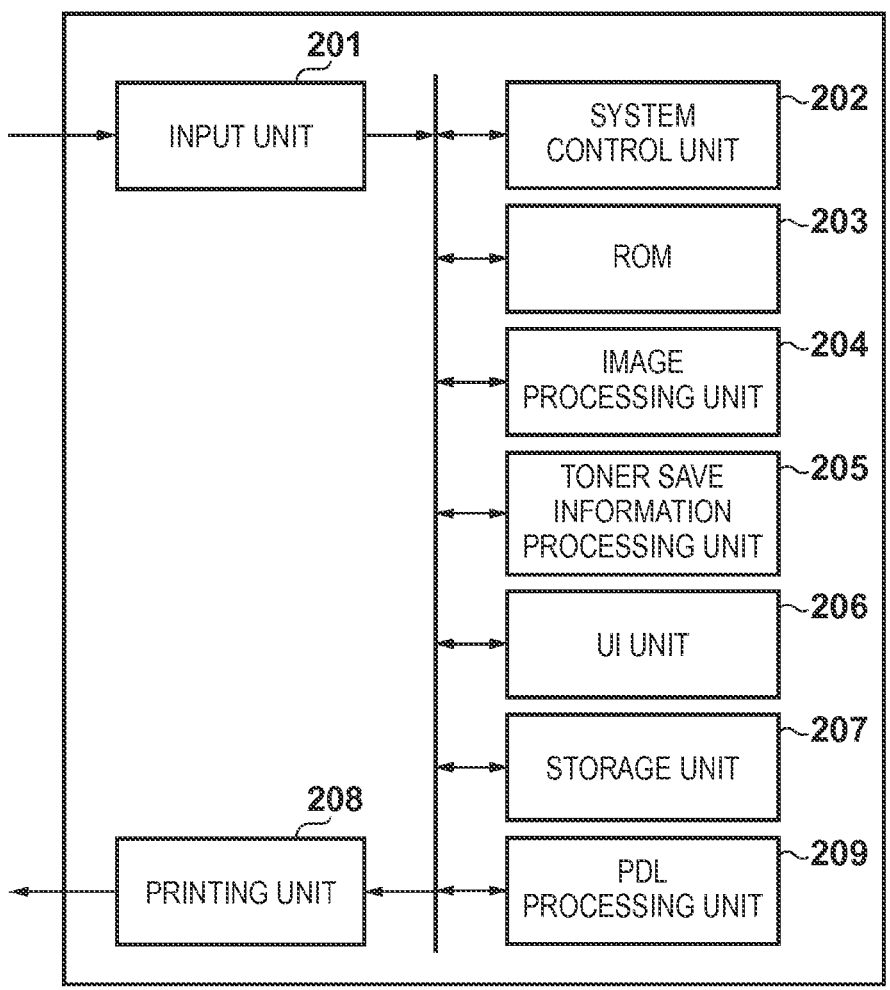
FIG. 2 is a block diagram exemplifying the arrangement of an image forming apparatus 101.

An example of the arrangement of the image forming apparatus 101 will be explained with reference to a block diagram shown in FIG. 2. As shown in FIG. 2, the image forming apparatus 101 includes an input unit 201, system control unit 202, ROM 203, image processing unit 204, toner save information processing unit 205, UI unit 206, storage unit 207, printing unit 208, and PDL processing unit 209. Details of each unit will be further described later.

An example of a screen displayed on the display devices (monitors) of the host computers 102 and 103 and the UI unit 206 will be explained with reference to FIG. 6. Toner save printing is set by two methods. One method is print setting by a printer driver installed in each of the host computers 102 and 103. In this setting, every time the user prints out, he sets a toner consumption amount in toner saving with a slider bar 601 for setting it, and confirms it by pressing an OK button 602. To cancel the setting, the user presses a cancel button 603. That is, the toner consumption amount is set in every printout.

The other method sets a toner consumption amount using the screen of FIG. 6 displayed on the UI unit 206 of the image forming apparatus 101, similar to the printer driver. In this case, all printouts from the image forming apparatus 101 are printed at a set toner consumption amount. An example "75%" indicated by the slider bar 601 means that printing is executed using 75% of a toner amount used in normal printing. The first embodiment will explain a case in which the image forming apparatus 101 sets a toner consumption amount in toner saving.

<Priority Items in Toner Save Printing>

An example of a screen displayed on the monitors of the host computers 102 and 103 and the UI unit 206 will be explained with reference to FIG. 7. The user can select an object which has priority in toner save printing. The user can select "photo priority" or "text priority" displayed in an area 701. When the user selects "photo priority", toner save processing is performed up to an "allowable value" for the photo part of a printout, and up to a "lower limit value" for the text part using a parameter smaller by one step than the "allowable value". The "lower limit value" is smaller than the "allowable value". When the user selects "text priority", toner save processing is performed up to an "allowable value" for the text part of a printout, and up to a "lower limit value" for the photo part. Note that the storage unit 207 saves in advance a toner save coefficient for "photo priority" and a toner save coefficient for "text priority" to perform this processing.

<"Allowable Value" & "Lower Limit Value" Decision Method>

Figure 8A:
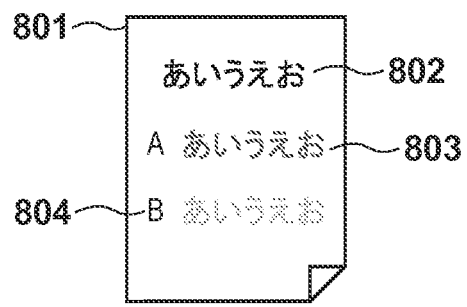
FIGS. 8A and 8B are views each exemplifying a printout from the image forming apparatus 101.
Figure 8B:
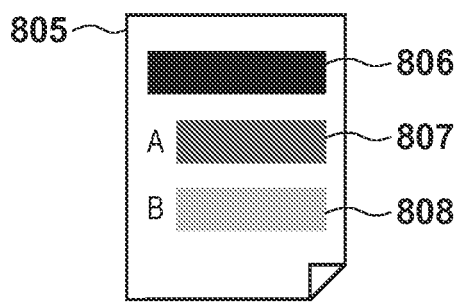
Figure 9:
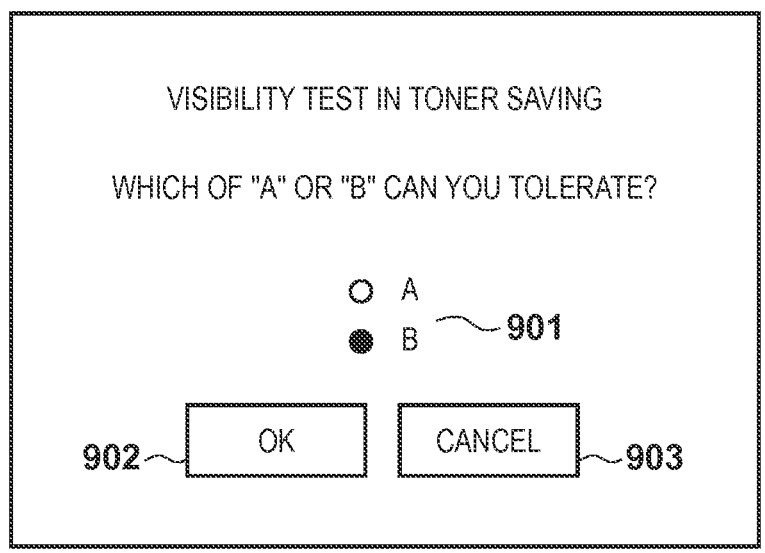
FIG. 9 is a view showing a screen which prompts the user to select a visibility test result in toner saving.

FIGS. 8A and 8B exemplify printouts from the image forming apparatus 101 when deciding an "allowable value" and "lower limit value". FIG. 8A shows an example of deciding an "allowable value" and "lower limit value" for the text. FIG. 8B shows an example of deciding an "allowable value" and "lower limit value" for the photograph. FIG. 9 is a view exemplifying a screen displayed on the UI unit 206.

When deciding an "allowable value" and "lower limit value" for the text, the user selects, from a printout 801 from the image forming apparatus 101, a text which is determined to be allowable upon toner save processing. In FIG. 8A, the user selects one of a printing result 802 in normal output, a printing result 803 when "75%" is selected with the slider bar 601, and a printing result 804 when "50%" is selected with the slider bar 601. "A" and "B" attached to the printing results are choices corresponding to "A" and "B" on a visibility test screen in toner saving shown in FIG. 9. When the user selects the printing result 803, that is, "A" as the "allowable value", a toner save coefficient obtained when "50%" is selected with the slider bar is set as the "lower limit value". Similarly, when the user selects the printing result 804, that is, "B" as the "allowable value", a toner save coefficient obtained when "25%" is selected with the slider bar is set as the "lower limit value".

As for a photograph, similar to the decision of the "allowable value" and "lower limit value" for the text, the user decides an "allowable value" and "lower limit value" by selecting either of "A" and "B" attached to respective printing results on a printout 805 in FIG. 8B.

In this manner, based on printing results, the user selects "A" or "B" using a selection button in an area 901 of the visibility test screen in toner saving, and presses a button 902, thereby deciding an "allowable value". When the user presses a button 903, the decision is canceled. Note that the storage unit 207 saves the decided "allowable value" and "lower limit value". In this example, the lower limit value is set to 50% when the allowable value is set to 75%, and 25% when it is set to 50%. However, this is merely an example. For example, when the user inputs an allowable value and lower limit value, text or image density examples corresponding to these values are displayed. After checking the displayed text or image, the user may approve the input allowable value and lower limit value. Alternatively, by approving either an allowable value or lower limit value, the other value may be decided, similar to the example of FIGS. 8A and 8B. In any case, the user can decide at least either the allowable value or lower limit value.

<Outline of Toner Save Printing>

Figure 3:
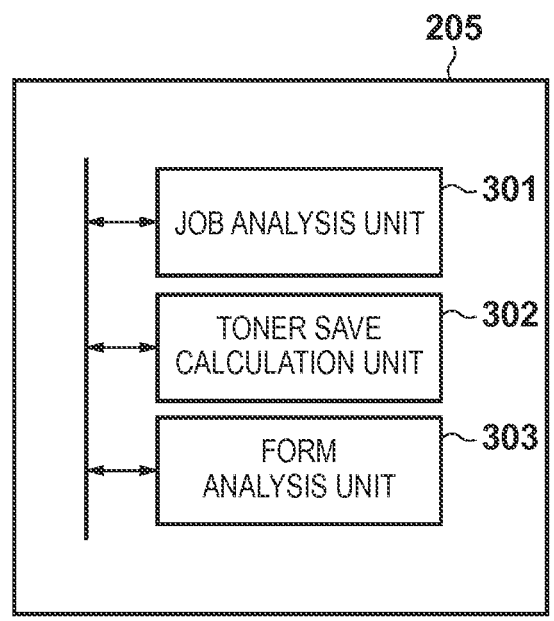
FIG. 3 is a block diagram showing the detailed arrangement of a toner save information processing unit 205.
Figure 4:
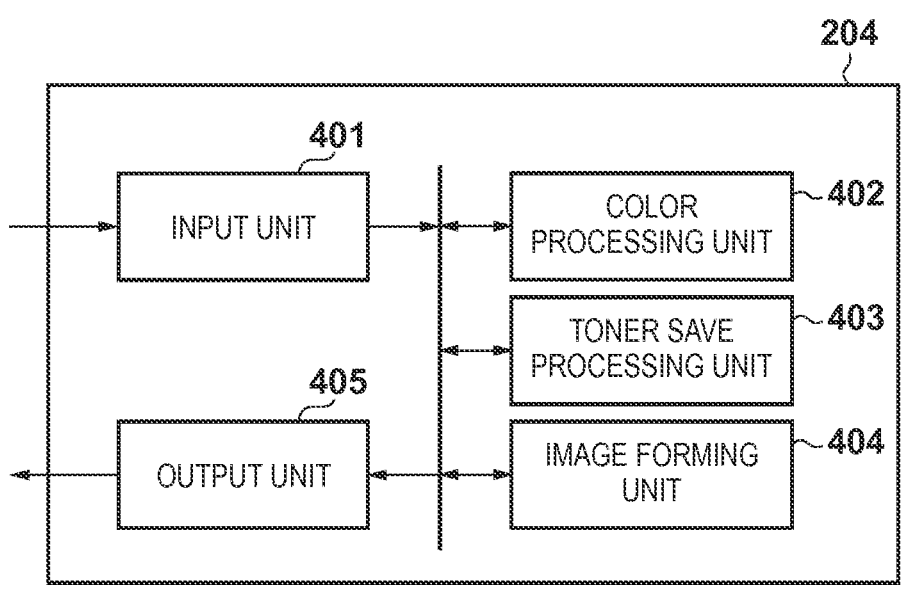
FIG. 4 is a block diagram showing the detailed arrangement of an image processing unit 204.

An outline of toner save printing will be explained. The toner save information processing unit 205 and image processing unit 204 shown in FIG. 2 execute toner save processing in toner save printing. As shown in FIG. 3, the toner save information processing unit 205 includes a job analysis unit 301 and toner save calculation unit 302. As shown in FIG. 4, the image processing unit 204 includes an input unit 401, color processing unit 402, toner save processing unit 403, image forming unit 404, and output unit 405.

Figure 5:
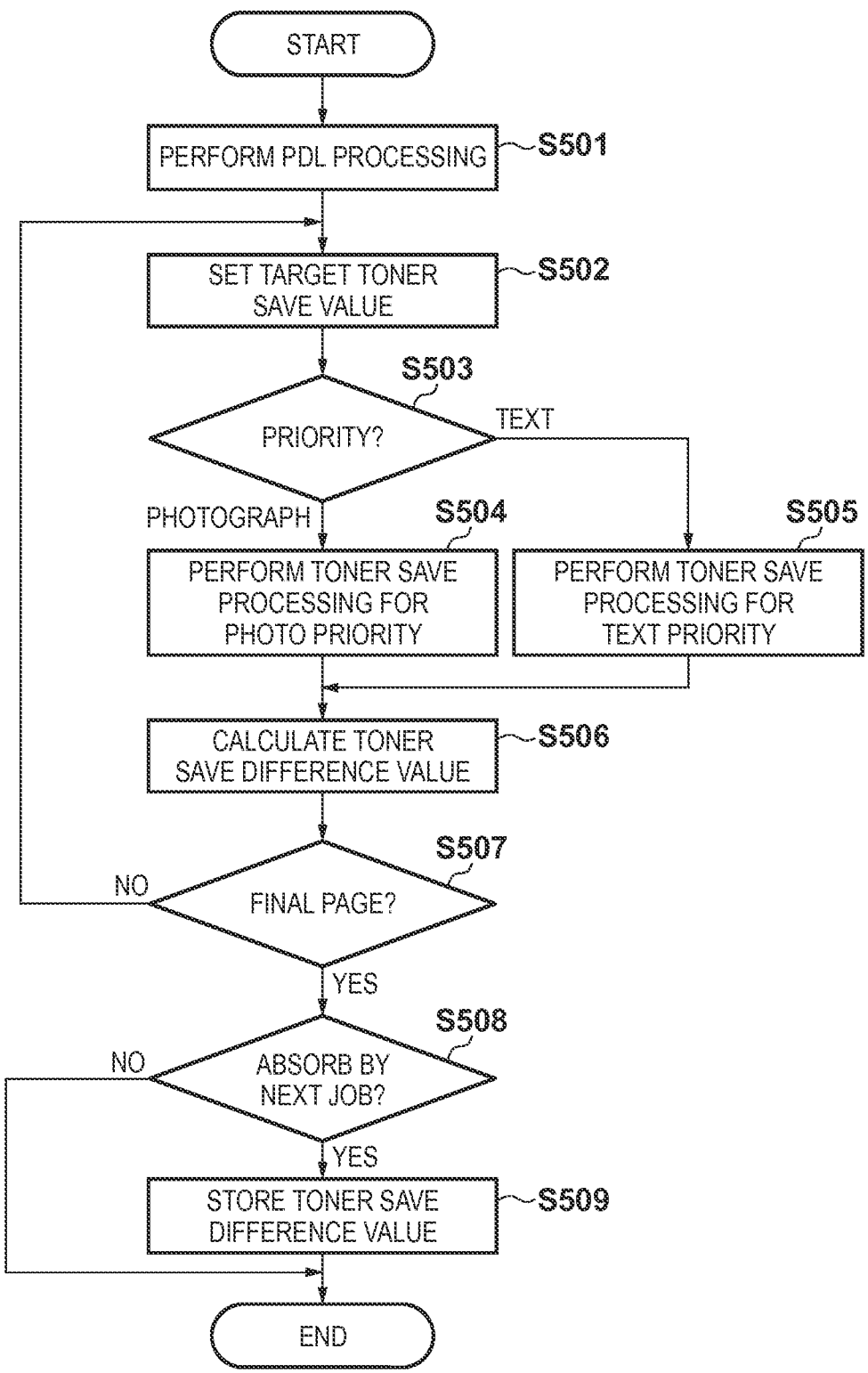
FIG. 5 is a flowchart showing toner save processing in toner save printing according to the first embodiment.

Toner save processing in toner save printing according to the first embodiment will be explained with reference to a flowchart shown in FIG. 5. Note that this processing is implemented by executing it with the system control unit 202 of the image forming apparatus 101 in accordance with a program stored in the ROM 203.

First, toner save processing when performing toner save printing for the first page of a document formed from a plurality of pages will be explained. In step S501, the input unit 201 receives printer driver data (a print job) sent from the printer driver in the host computer 102. The PDL processing unit 209 analyzes the received printer driver data, and creates PDL data. After that, the PDL processing unit 209 rasterizes the PDL data to create bitmap data, image-compresses the created bitmap data, and transmits the compressed data to the image processing unit 204. As the compression method, a general method (for example, JPEG) is used.

In step S502, the system control unit 202 transmits, to the toner save information processing unit 205, the set value of a target toner save amount set on the UI unit 206. The toner save calculation unit 302 receives the set value. In step S502, a toner consumption amount in toner saving is set by designating the UI shown in FIG. 6. In step S503, the system control unit 202 transmits, to the toner save information processing unit 205, the setting of a priority item in toner save printing that is set on the UI unit 206. The toner save calculation unit 302 determines the setting of the priority item. If the toner saving calculation unit 302 determines that "photo priority" is set, the process advances to step S504, and the toner save calculation unit 302 reads out the toner save coefficient for "photo priority" from the storage unit 207, and transmits it to the toner save processing unit 403 of the image processing unit 204. In step S504, toner save processing for photo priority is performed using the target toner save amount set in step S502. In step S502, for the second and subsequent pages, the toner save calculation unit 302 adds a toner save difference value calculated in step S506 (to be described later) to the set target toner save amount, and sets the calculated value as a target toner save amount for the next page. In step S502, for the first page, the toner save calculation unit 302 adds a toner save difference value saved in step S509 (to be described later) to the set target toner save amount, and sets the calculated value as a target toner save amount for the next page. A target toner save amount reflecting the difference value will be referred to as a target toner save amount set in step S502. If difference values are saved in the same memory area for the first page and the second and subsequent pages, a difference value for the first page and that for the second and subsequent pages need not be discriminated from each other.

If the toner saving calculation unit 302 determines in step S503 that "text priority" is set, the process advances to step S505, and the toner save calculation unit 302 reads out the toner save coefficient for "text priority" from the storage unit 207, and transmits it to the toner save processing unit 403 of the image processing unit 204. In step S505, toner save processing for text priority is performed using the target toner save amount set in step S502.

The input unit 401 in the image processing unit 204 decompresses the image-compressed bitmap data. The color processing unit 402 performs color conversion for the decompressed bitmap data. Color conversion is processing of, when bitmap data is RGB data, converting it into CMYK data, and when it is CMYK data, not converting it.

In step S506, the toner save processing unit 403 calculates an actual toner save amount from the histogram of bitmap data before toner save processing and that of bitmap data after toner save processing. Bitmap data before toner save processing is bitmap data before processing in step S504 (or step S505). Bitmap data after toner save processing is bitmap data after processing in step S504 (or step S505). The actual toner save amount is a toner save amount before and after toner save processing in the toner save processing unit 403. As for a toner amount before toner save processing, a sum A is calculated by adding the C, M, Y, and K values of each pixel in bitmap data before toner save processing for all the pixels of the bitmap data. As for a toner amount after toner save processing, a sum B is calculated by adding the C, M, Y, and K values of each pixel in bitmap data after toner save processing for all the pixels of the bitmap data. Assuming that the sums A and B of pixels and consumed toner amounts have a linear relationship, the consumed toner amounts are given by k×A (g) and k×B (g) (k is a coefficient). The calculated actual toner save amount is compared with the target toner save amount set in step S502. After the comparison, the toner save processing unit 403 calculates a toner save difference value by subtracting the actual toner save amount from the target toner save amount, and transmits it to the toner save calculation unit 302. For example, when the target toner save value set in step S502 is 75%, the calculated actual toner save amount (k×A−0.83 k×A (g)) is compared with the target toner save amount (k×A−0.75 k×A (g)). Subtracting the actual toner save amount from the target toner save amount yields 0.08 k×A (g). When toner is reduced to only 0.83 k×A (g), the remaining difference of 0.08 k×A (g) is transmitted to the toner save calculation unit 302. For example, when a given page has few images and most of the page is blank, there are few objects for which toner can be reduced, and the target toner save amount cannot be achieved. In contrast, when toner is reduced to 0.65 k×A (g) at the 75% setting, that is, 0.75 k×A (g), the achieved difference of 0.1 k×A (g) is transmitted to the toner save calculation unit 302.

Next, processing for the Nth page (N is an integer of 2 or more) of a document formed from a plurality of pages will be explained. A sum C is calculated by adding the C, M, Y, and K values of each pixel in bitmap data before toner save processing of the Nth page for all the pixels. In step S507, the job analysis unit 301 determines whether processing is completed up to the final page. If the current page is not the final page, the toner save calculation unit 302 calculates a new target toner save amount including the received toner save difference value in step S502. For example, when the target toner save value set in step S502 before calculating an actual toner save amount is 75%, the new target toner save amount is 0.75 k×C (g). If 0.08 k×A (g) is remaining as the toner save difference value calculated in step S506, the new target toner save value is 0.75 k×C (g)−0.08 k×A (g). In step S502, ((0.75 k×C−0.08 k×A)×100/(k×C)) % is set again as the target toner save value. Thereafter, the processes in steps S502 to S507 are repeated. If the job analysis unit 301 determines in step S507 that the current page is the final page, the toner save calculation unit 302 determines in step S508 whether there is a toner save difference value to be considered for the next job different from the document. If the toner save calculation unit 302 determines that there is no toner save difference value to be considered, the process ends. If the toner save calculation unit 302 determines that there is a toner save difference value to be considered, the toner save calculation unit 302 transmits, to the storage unit 207, a toner save difference value obtained at the end of all pages, and the storage unit 207 saves it in step S509. When steps S501 to S509 are repeated for the next job, the toner save calculation unit 302 calculates a new target toner save amount including the toner save difference value saved in the storage unit 207. In FIG. 5, if there is no difference value in step S508, that is, the difference value is 0, the process skips step S509. However, the target value may exceed an appropriate printing range owing to accumulation of toner save difference values between jobs. To prevent accumulation of difference values, the determination criterion in step S508 may be a user-designated option, and if an option "absorb" is designated for the next job, the difference value may be saved. In this case, if no option is designated, the difference value to be saved is set to 0.

After that, the image forming unit 404 performs image forming processing, and the output unit 405 transmits print data to the printing unit 208. Upon receiving the print data, the printing unit 208 prints out in accordance with the print data.

<Toner Save Processing in "Text Priority">

Figure 10:
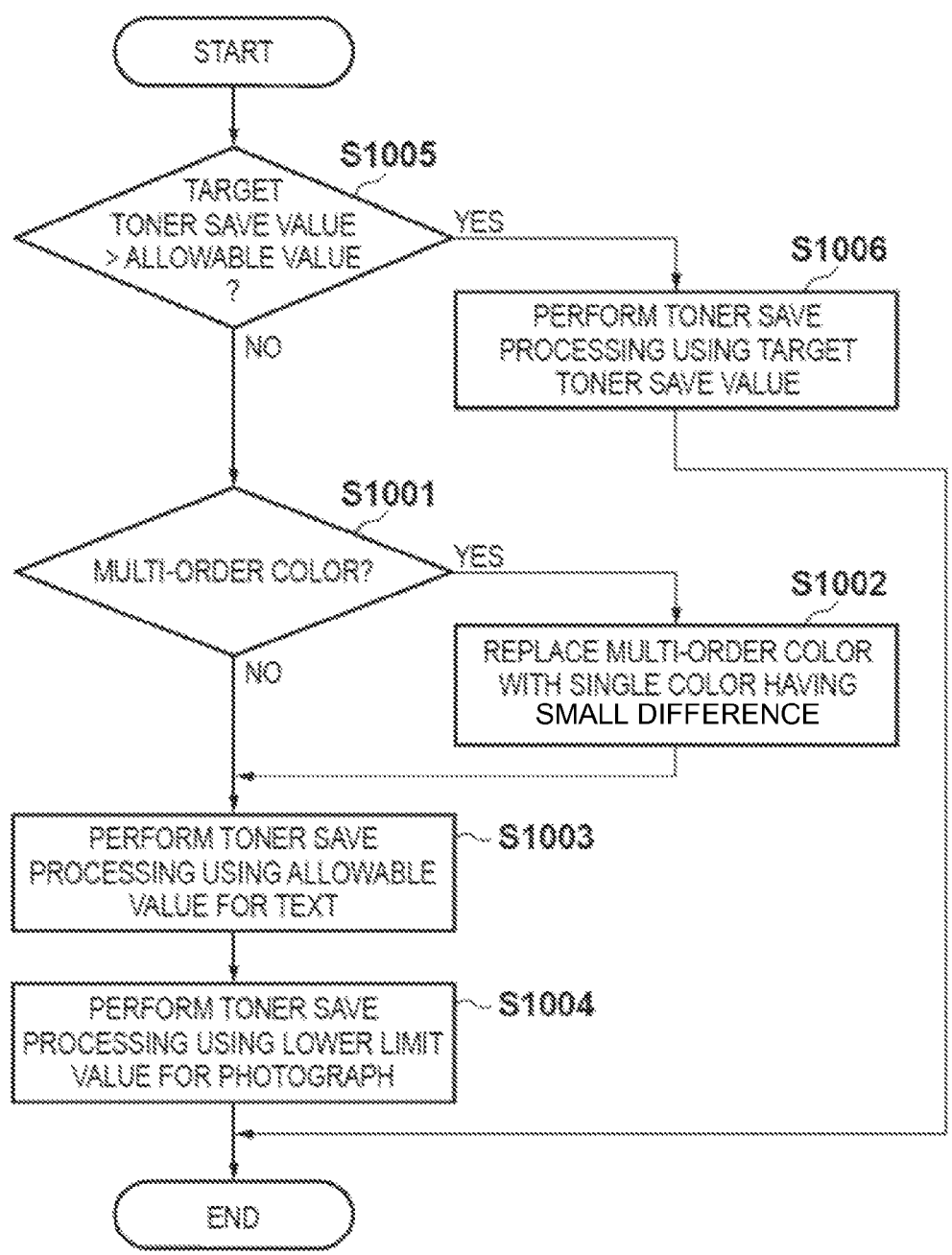
FIG. 10 is a flowchart showing details of toner save processing in "text priority"

Details of toner save processing in "text priority" will be described with reference to a flowchart shown in FIG. 10. Note that this processing is implemented by executing it by the system control unit 202 of the image forming apparatus 101 in accordance with a program stored in the ROM 203.

If the target toner save value exceeds the allowable value in step S1005, the process advances to step S1006, and the toner save calculation unit 302 prepares a linear processing coefficient capable of achieving the target toner save value, and transmits it to the toner save processing unit 403. The toner save processing unit 403 performs toner save processing for bitmap data using the linear processing coefficient in the entire density region, as shown in FIG. 12B. If the target toner save value is equal to or smaller than the allowable value in step S1005, the toner save calculation unit 302 determines, in step S1001 using bitmap data which has been converted into CMYK data by the color processing unit 402, whether the text color of the text part is a multi-order color or single color. The single color is a color containing only a single color component, and the multi-order color is a color containing a plurality of color components. If the text color is a multi-order color, the process advances to step S1002, and the toner save calculation unit 302 replaces the multi-order color with a single color having a smallest color difference. For example, when the processing target color is red, red serving as a multi-order color is replaced with magenta which is a single color having a smallest color difference. Red contains yellow and magenta color components, so when it is replaced with magenta, toner is saved by the yellow toner amount. When a multi-order color is converted into a single color, not only hue but also lightness (density) change. When the paper color is white, the lightness of an image increases by a toner amount removed upon color component removal. To compensate for the increase, the value of the color component of the single color after conversion may be increased. Even when lightness compensation is performed in conversion from red into magenta, yellow toner hardly affects change of the lightness, and magenta toner increases only by a small amount. Even in this example, toner can be saved by the yellow toner amount.

If it is determined that the text color is not a multi-order color or replacement with a single color is completed in step S1002, the process advances to step S1003. In step S1003, the toner save calculation unit 302 prepares, for bitmap data, a linear processing coefficient capable of keeping to the "allowable value" for the text, and transmits it to the toner save processing unit 403. The toner save processing unit 403 performs toner save processing for the bitmap data using the coefficient for the text part (text region).

In step S1004, the toner save calculation unit 302 prepares a linear processing coefficient capable of keeping to the "lower limit value" for the photograph, and transmits it to the toner save processing unit 403. The toner save processing unit 403 performs toner save processing using the coefficient for the photo part (photo region).

The text regions and the photo regions have been determined in the target image in accordance with the well-known technique. For example, the text region is determined by detecting edges in the target image. Remaining regions are determined to be the photo regions.

<Toner Save Processing in "Photo Priority">

Figure 11:
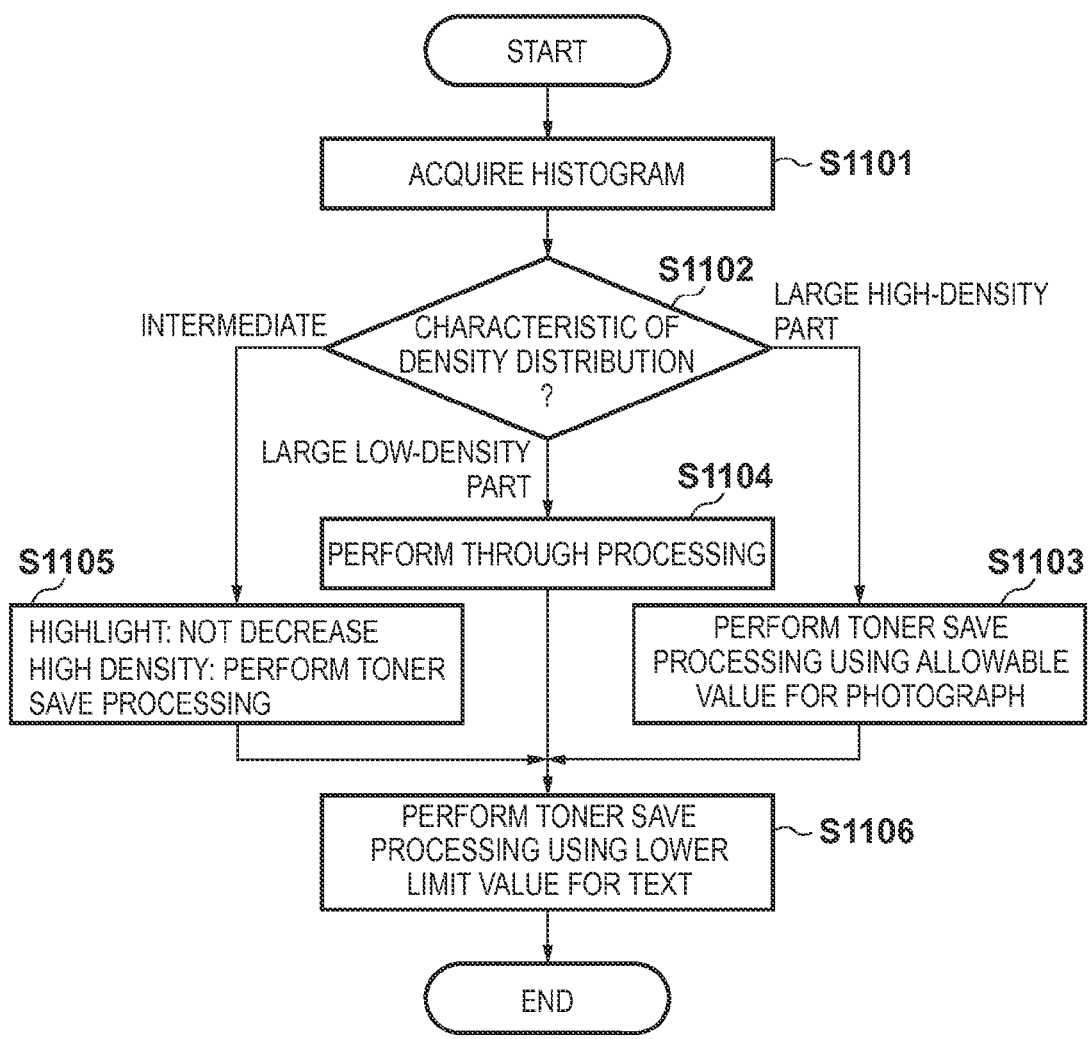
FIG. 11 is a flowchart showing details of toner save processing in "photo priority"

Next, details of toner save processing in "photo priority" will be described with reference to a flowchart shown in FIG. 11. Note that this processing is implemented by executing it by the system control unit 202 of the image forming apparatus 101 in accordance with a program stored in the ROM 203.

The color processing unit 402 acquires the histogram of the photo part in step S1101, and the toner save calculation unit 302 determines the distribution result (distribution characteristic) in step S1102. If the toner saving calculation unit 302 determines that the barycenter of the peak of the histogram is on the right side from the center, that is, the distribution has a large high-density part (FIG. 12A), the process advances to step S1103. The toner save calculation unit 302 prepares a linear processing coefficient capable of keeping to the "allowable value" for the photograph, as shown in FIG. 12B, and transmits it to the toner save processing unit 403. The toner save processing unit 403 performs toner save processing using the coefficient for the photo part. In step S1103, if the target toner save value exceeds the allowable value, the toner save calculation unit 302 performs toner save processing using a linear processing coefficient capable of achieving the target toner save value. If the target toner save value is smaller than the allowable value, the toner save calculation unit 302 performs toner save processing using a linear processing coefficient capable of keeping to the allowable value.

If the toner save calculation unit 302 determines in step S1102 that the barycenter of the peak of the histogram is on the left side from the center, that is, the distribution has a large low-density part (FIG. 12C), the process advances to step S1104. The toner save calculation unit 302 prepares a coefficient for performing no processing, as shown in FIG. 12D, and transmits it to the toner save processing unit 403. The toner save processing unit 403 performs toner save processing using the coefficient for the photo part.

If the toner save calculation unit 302 determines in step S1102 that, for example, the histogram has a plurality of peaks and it cannot be determined which of low- and high-density parts is larger (FIG. 12E), the process advances to step S1105. In this case, the toner save calculation unit 302 prepares a linear processing coefficient capable of keeping to the "allowable value" for the photograph in the high-density part, without performing processing in the low-density part, as shown in FIG. 12F, and transmits it to the toner save processing unit 403. The toner save processing unit 403 performs toner save processing using the coefficient for the photo part. In step S1105, if the target toner save value exceeds the allowable value, the toner save calculation unit 302 performs toner save processing for the high-density part using a linear processing coefficient capable of achieving the target toner save value, without performing processing for the low-density part. If the target toner save value is smaller than the allowable value, the toner save calculation unit 302 performs toner save processing using a linear processing coefficient capable of keeping to the allowable value, without performing processing for the low-density part.

In the determination of step S1102, it is also possible to calculate the weighted average of the barycenter of the peak by weighting a peak density by the frequency, and compare it with a threshold. In this case, two thresholds (high-density threshold and low-density threshold) are prepared in advance to discriminate a distribution characteristic having a large high-density part, a distribution characteristic having a large low-density part, and an intermediate distribution characteristic. If the barycenter of the peak is a density lower than the low-density threshold, it can be determined that the image has a characteristic in which the low-density part is large. If the barycenter of the peak is a density higher than the high-density threshold, it can be determined that the image has a characteristic in which the high-density part is large. If the barycenter of the peak is a density which is higher than the low-density threshold and lower than the high-density threshold, it can be determined that the image has an intermediate characteristic.

In step S1106, the toner save calculation unit 302 prepares a linear processing coefficient capable of keeping to the "lower limit value" for the text, and transmits it to the toner save processing unit 403. The toner save processing unit 403 performs toner save processing using the coefficient for the text part.

According to the first embodiment, a set toner save amount can be kept to strictly in accordance with the setting of an object which has priority in toner save processing, and an image quality the user wants can be maintained.

Second Embodiment

The second embodiment according to the present invention will be described in detail with reference to the accompanying drawings. In the second embodiment, in addition to the features in the first embodiment, when multicopy printing is designated, it is desirable that the output results of respective printouts do not have a difference. Even if there is a toner save difference value, a new target toner save amount for the next page is not considered. In multicopy printing, the same page is printed by a plurality of copies designated by the user.

The arrangements of a printing system and image forming apparatus in the second embodiment are the same as those in the first embodiment, and a description thereof will not be repeated.

Figure 13:
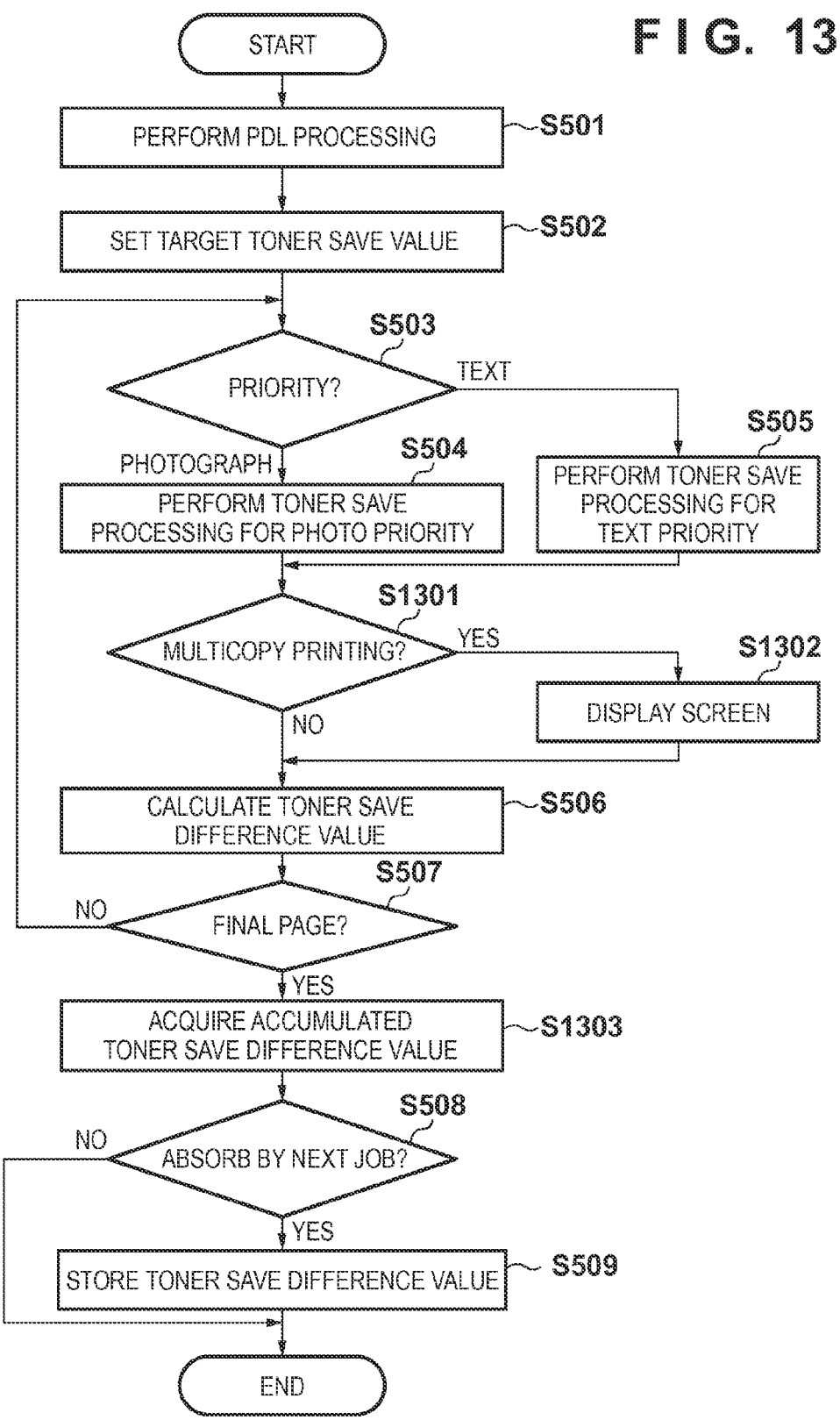
FIG. 13 is a flowchart showing toner save processing in toner save printing according to the second embodiment.

Toner save processing in toner save printing according to the second embodiment will be explained with reference to a flowchart shown in FIG. 13. Note that this processing is implemented by executing it by a system control unit 202 of an image forming apparatus 101 in accordance with a program stored in a ROM 203. Processes in steps S501 to S505 are the same as those in the first embodiment, and a description thereof will not be repeated.

Figure 14:
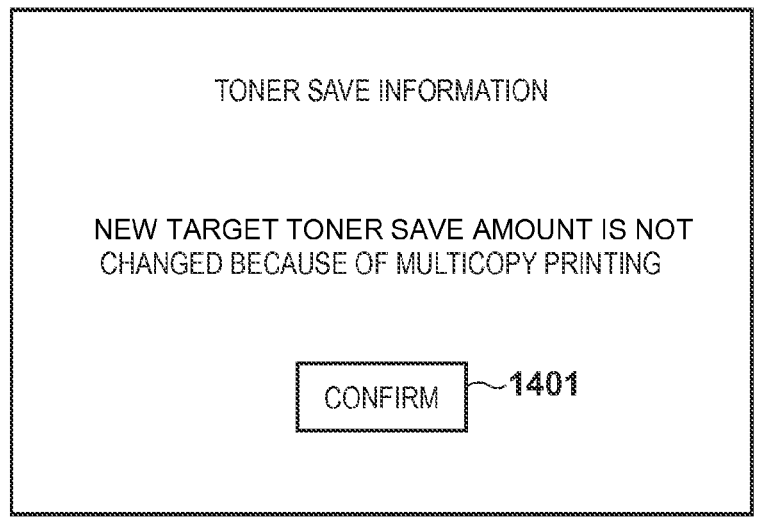
FIG. 14 is a view showing a toner save information display screen in the second embodiment.

In step S1301, a job analysis unit 301 determines whether a job to be printed designates multicopy printing. If the job designates multicopy printing, the process advances to step S1302, and the job analysis unit 301 displays, on the screen of a UI unit 206, a screen "a new target toner save amount is not changed because of multicopy printing" as shown in FIG. 14. Although this screen can be canceled by pressing a button 1401, it automatically disappears upon the lapse of a predetermined time. If a plurality of copies are designated, the job analysis unit 301 determines in step S1301 that the job designates multicopy printing.

In step S506, a toner save processing unit 403 calculates an actual toner save amount from the histogram of bitmap data before toner save processing and that of bitmap data after toner save processing, and compares the calculated actual toner save amount with a target toner save amount set in step S502. After the comparison, the toner save processing unit 403 calculates a toner save difference value by subtracting the actual toner save amount from the target toner save amount, and transmits it to a toner save calculation unit 302.

In step S507, the job analysis unit 301 determines whether image processing is completed up to the final page. If the current page is not the final page, the process branches to step S503, so the toner save calculation unit 302 does not change the target toner save amount. The toner save difference value is transmitted to a storage unit 207, and the storage unit 207 accumulates and saves it. After that, the processes in steps S503 to S507 are repeated. Every time one page ends, the toner save difference value is transmitted to the storage unit 207, and added to the toner save difference value of a preceding page.

If the job analysis unit 301 determines in step S507 that the current page is the final page, the process advances to step S1303, and the toner save calculation unit 302 acquires the toner save difference value in multicopy printing that is accumulated in the storage unit 207. In step S508, the toner save calculation unit 302 determines whether there is a toner save difference value to be considered for the next job. If there is no toner save difference value to be considered, the process ends. If there is a toner save difference value to be considered, the toner save calculation unit 302 transmits, to the storage unit 207, a value obtained by accumulating toner save difference values obtained at the end of all pages, and the storage unit 207 saves it in step S509.

According to the second embodiment, when multicopy printing is designated, printing continues without calculating a new target toner save amount for the next page based on the toner save difference value. Thus, the same image quality can be obtained for all pages. The toner save difference value is calculated for an entire print job, and the difference can be compensated for in the next print job.

Third Embodiment

The third embodiment according to the present invention will be described in detail with reference to the accompanying drawings. In addition to the features of the first embodiment, the third embodiment considers the fact that when print data contains a form, the output results of respective printouts are desirably free from a difference. To attain this, even if there is a toner save difference value, a new target toner save amount for the next page is not considered. The form is data defined separately. For example, the form is a print data file defined in advance. Since the form is cited in a predetermined format, the presence/absence of a form in print data can be determined.

The arrangements of a printing system and image forming apparatus in the third embodiment are the same as those in the first embodiment, and a description thereof will not be repeated.

Figure 15:
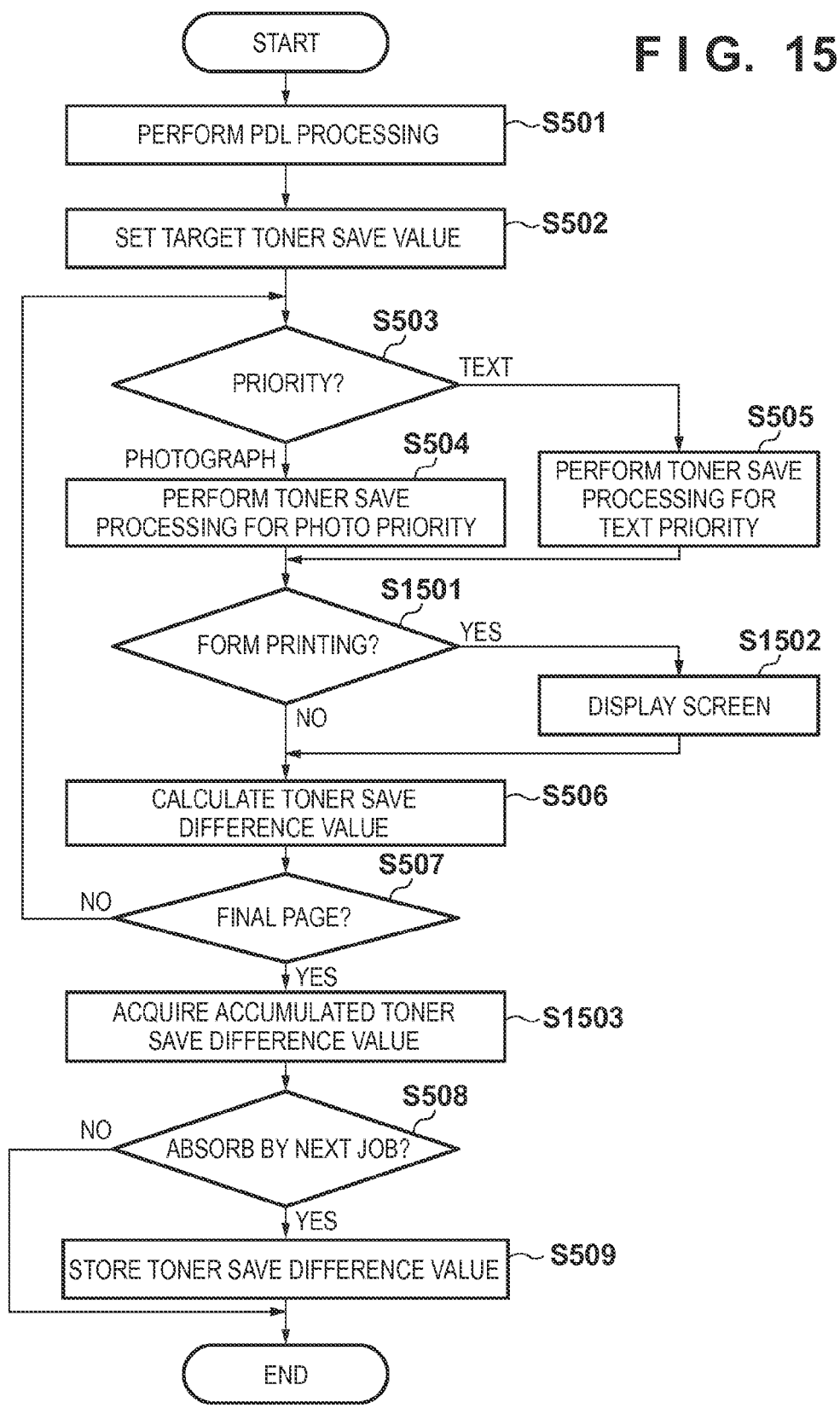
FIG. 15 is a flowchart showing toner save processing in toner save printing according to the third embodiment.

Toner save processing in toner save printing according to the third embodiment will be explained with reference to a flowchart shown in FIG. 15. Note that this processing is implemented by executing it by a system control unit 202 of an image forming apparatus 101 in accordance with a program stored in a ROM 203. Processes in steps S501 to S505 are the same as those in the first embodiment, and a description thereof will not be repeated.

Figure 16:
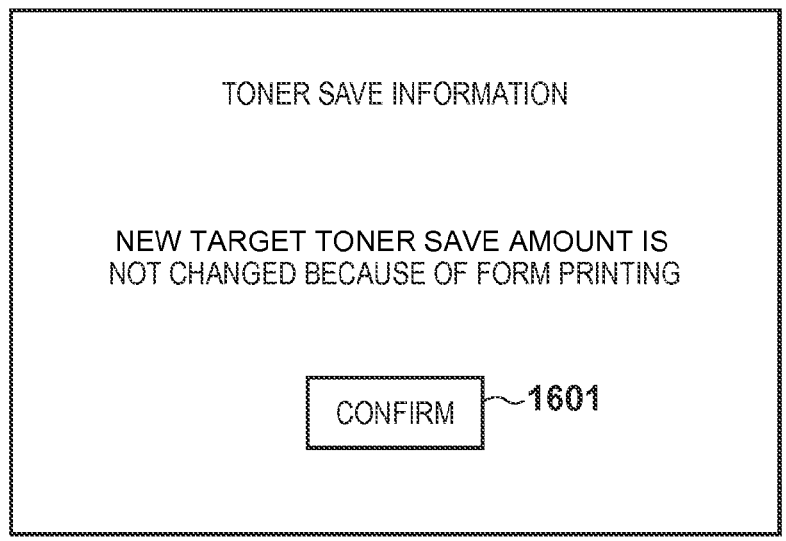
FIG. 16 is a view showing a toner save information display screen in the third embodiment.

In step S1501, a form analysis unit 303 determines whether a job to be printed contains a form. If the form analysis unit 303 determines that the job contains a form, the process advances to step S1502, and a job analysis unit 301 displays, on the screen of a UI unit 206, a screen "a new target toner save amount is not changed because of form printing", as shown in FIG. 16. Although this screen can be canceled by pressing a button 1601, it automatically disappears upon the lapse of a predetermined time.

In step S506, a toner save processing unit 403 calculates an actual toner save amount from the histogram of bitmap data before toner save processing and that of bitmap data after toner save processing, and compares the calculated actual toner save amount with a target toner save amount set in step S502. After the comparison, the toner save processing unit 403 calculates a toner save difference value by subtracting the actual toner save amount from the target toner save amount, and transmits it to a toner save calculation unit 302.

In step S507, the job analysis unit 301 determines whether image processing is completed up to the final page. If the current page is not the final page, the toner save calculation unit 302 does not change the target toner save amount in step S502. The toner save difference value is transmitted to a storage unit 207, and the storage unit 207 saves it. Thereafter, the processes in steps S504 to S507 are repeated. Every time one page ends, the toner save difference value is transmitted to the storage unit 207, and added to the toner save difference value of a preceding page.

If the job analysis unit 301 determines in step S507 that the current page is the final page, the process advances to step S1503, and the toner save calculation unit 302 acquires the toner save difference value in form printing that is accumulated in the storage unit 207. In step S508, the toner save calculation unit 302 determines whether there is a toner save difference value to be considered for the next job. If there is no toner save difference value to be considered, the process ends. If there is a toner save difference value to be considered, the toner save calculation unit 302 transmits, to the storage unit 207, a toner save difference value obtained at the end of all pages, and the storage unit 207 saves it.

According to the third embodiment, when form printing is designated, printing continues without calculating a new target toner save amount for the next page based on the toner save difference value. The same image quality can be obtained for all pages.

Fourth Embodiment

The fourth embodiment according to the present invention will be described in detail with reference to the accompanying drawings. In the fourth embodiment, in addition to the features in the first to third embodiments, the toner save difference value is managed for each user to calculate a new target toner save amount in accordance with the user.

The arrangements of a printing system and image forming apparatus in the fourth embodiment are the same as those in the first embodiment, and a description thereof will not be repeated.

Figure 18:
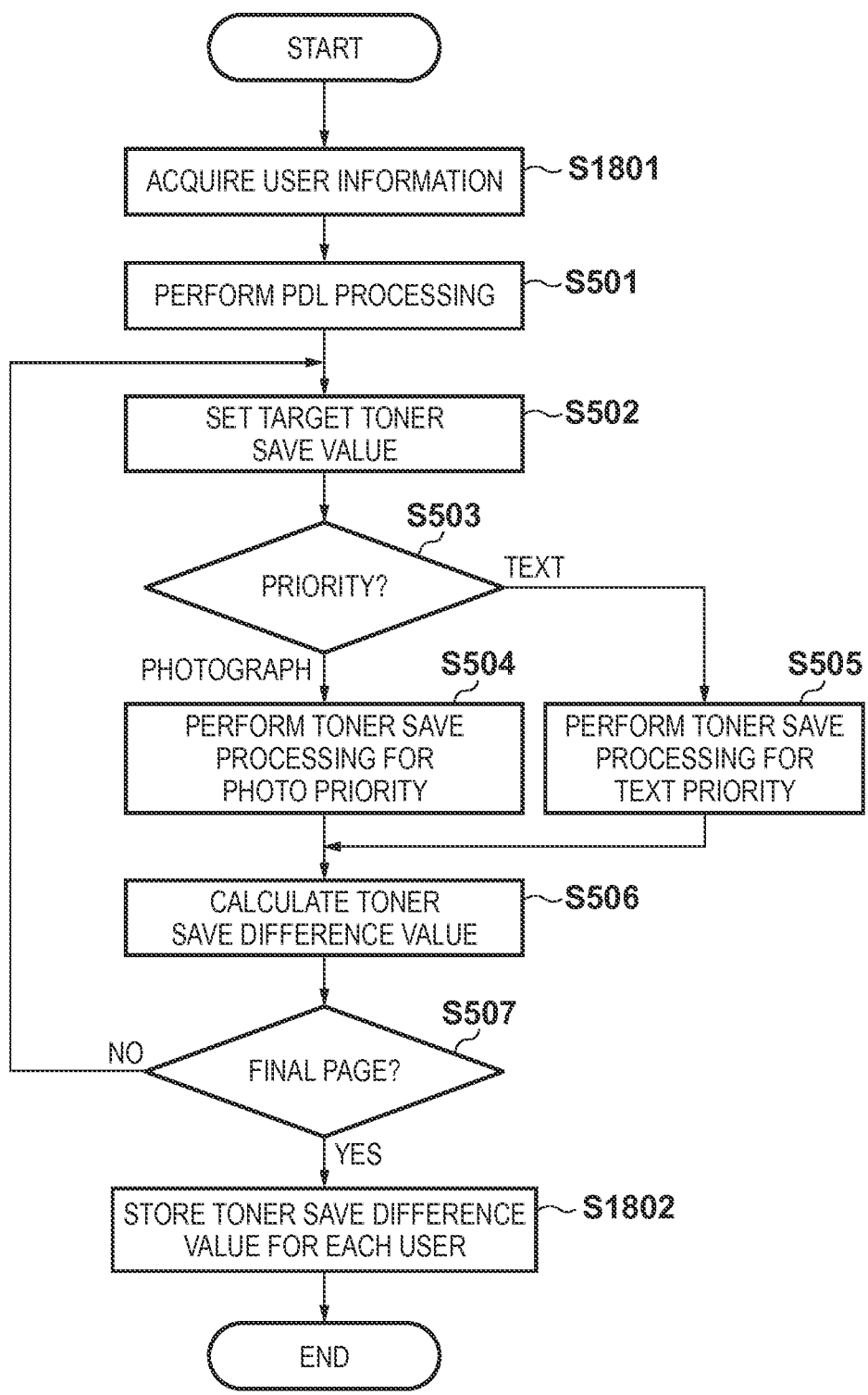
FIG. 18 is a flowchart showing toner save processing in toner save printing according to the fourth embodiment.

Toner save processing in toner save printing according to the fourth embodiment will be explained with reference to a flowchart shown in FIG. 18. Note that this processing is implemented by executing it by a system control unit 202 of an image forming apparatus 101 in accordance with a program stored in a ROM 203. Processes in steps S501 to S507 are the same as those in the first embodiment, and a description thereof will not be repeated.

In step S1801, a job analysis unit 301 acquires user information of the job, and saves it in a storage unit 207. After executing the processes in step S501 to S507, the process advances to step S1802, and a toner save calculation unit 302 saves a toner save difference value generated in the job in association with the user information which has already been stored in the storage unit 207. In step S502, the target toner save amount is calculated in consideration of the toner save difference value which has been saved in association with the user.

When processing the next job, the job analysis unit 301 acquires user information of the job in step S1801. Based on information saved in the storage unit 207, the job analysis unit 301 determines whether the user has a toner save difference value. If the user has a toner save difference value, the toner save calculation unit 302 calculates a new target toner save amount in step S502. If the user does not have a toner save difference value, the toner save calculation unit 302 calculates a target toner save amount without considering a toner save difference value.

Figure 17:
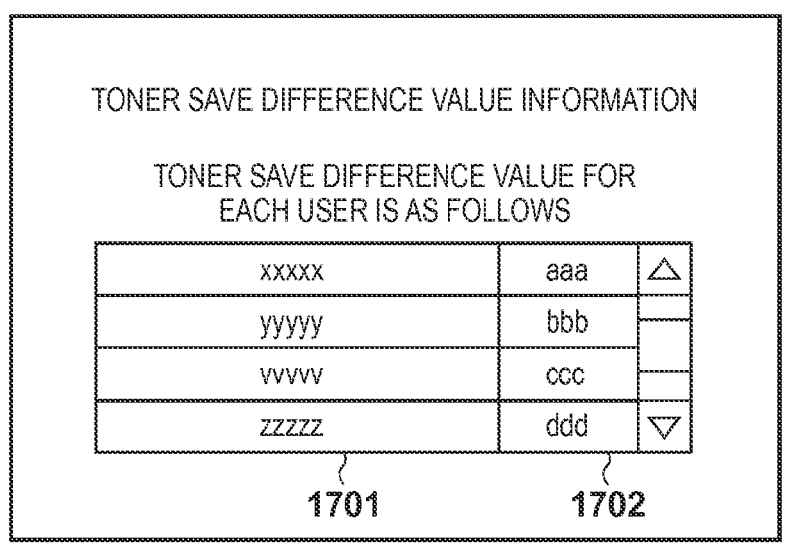
FIG. 17 is a view showing a toner save difference value information display screen in the fourth embodiment.

The user can confirm a toner save difference value for each user on a screen shown in FIG. 17 that is displayed on the screen of a UI unit 206. As shown in FIG. 17, a list of user names 1701 and toner save difference values 1702 of the users is displayed on the screen. Note that a step corresponding to step S508 of FIG. 5 is not performed in the fourth embodiment, but may be executed immediately before step S1802. In this case, step S1802 is executed as long as an option for absorbing a toner save difference value in the next job is selected.

According to the fourth embodiment, the toner save difference value is managed for each user. Reduction of a toner amount usable by a user, which is caused by printing by another user, can be prevented.

Other Embodiments

Aspects of the present invention can also be realized by a computer of a system or apparatus (or devices such as a CPU or MPU) that reads out and executes a program recorded on a memory device to perform the functions of the above-described embodiment(s), and by a method, the steps of which are performed by a computer of a system or apparatus by, for example, reading out and executing a program recorded on a memory device to perform the functions of the above-described embodiment(s). For this purpose, the program is provided to the computer for example via a network or from a recording medium of various types serving as the memory device (for example, computer-readable medium).

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application Nos. 2011-241526, filed Nov. 2, 2011, and 2012-229246, filed Oct. 16, 2012, which are hereby incorporated by reference herein in their entirety.

What is claimed is:

1. An image forming apparatus comprising:
a setting unit configured to set a target color material saving value;
a reduction unit configured to process color material data of a first page of a print job formed of a plurality of pages to reduce the color material to be consumed in the first page using the set target color material saving value; and
a comparison unit configured to compare an amount of the color material reduced by reduction processing by the reduction unit with an amount of the color material obtained from the target color material saving value set by the setting unit,
the setting unit further configured to set a target color material saving value of a second page of the print job based on the amount of the color material reduced by the reduction processing by the reduction unit and the amount of the color material obtained from the target color material saving value set by the setting unit if, as a result of the comparison by the comparison unit, the amount of the color material reduced by the reduction processing by the reduction unit is less than the amount of the color material obtained from the target color material saving value set by the setting unit.

2. The apparatus according to claim 1, wherein the setting unit is configured to set the target color material saving value of the second page based on a difference between the amount of the color material reduced by the reduction processing by the reduction unit and the amount of the color material obtained from the target color material saving value set by the setting unit.

3. The apparatus according to claim 1, wherein in a case where printing of a plurality of copies is set for the print job, the reduced amount of the color material to be consumed in the second page is the same as the reduced amount of the color material to be consumed in the first page.

4. The apparatus according to claim 1, wherein in a case where the print job designates form printing, the reduced amount of the color material to be consumed in the second page is the same as the reduced amount of the color material to be consumed in the first page.

5. The apparatus according to claim 1, further comprising a management unit configured to acquire user information of the print job, and manage the difference value of the target color material saving value for each user in accordance with the user information,
wherein the first setting unit sets the target color material saving value for each user based on the difference value of the target color material saving value for each user.

6. A method of controlling an image forming apparatus, comprising:
setting a target color material saving value;
processing color material data of a first page of a print job formed of a plurality of pages to reduce the color material to be consumed in the first page using the set target color material saving value;

comparing an amount of the color material reduced by the processing with an amount of the color material obtained from the target color material saving value set by the setting; and setting a target color material saving value of a second page of the print job based on the amount of the color material reduced by the processing and the amount of the color material obtained from the target color material saving value set by the setting if, as a result of the comparing, the amount of the color material reduced by the processing is less than the amount of the color material obtained from the target color material saving value set by the setting.

7. A non-transitory computer-readable medium in which a program is embodied for causing a computer to perform the steps of the method of controlling an image forming apparatus defined in claim 6.

* * * * *